United States Patent [19]

Voss

[11] Patent Number: 4,918,975

[45] Date of Patent: Apr. 24, 1990

[54] METHOD AND APPARATUS FOR TESTING FLUID-FILLED SYSTEMS FOR LEAKS

[75] Inventor: Günter Voss, Much, Fed. Rep. of Germany

[73] Assignee: Leybold Aktiengesellschaft, Cologne, Fed. Rep. of Germany

[21] Appl. No.: 175,800

[22] Filed: Mar. 31, 1988

[30] Foreign Application Priority Data

Mar. 31, 1987 [EP] European Pat. Off. ........ 87104737.9

[51] Int. Cl.$^5$ .............................................. G01M 3/20
[52] U.S. Cl. ..................................................... 73/40.7
[58] Field of Search ............................ 73/40.7, 40.5 R

[56] References Cited

U.S. PATENT DOCUMENTS

| | | | |
|---|---|---|---|
| 2,504,530 | 4/1950 | Jacobs | 73/40.7 |
| 3,425,264 | 2/1969 | Frei | 73/40.7 X |
| 3,939,695 | 2/1976 | Booth | 73/40.7 |
| 4,232,546 | 11/1980 | Dumont | 73/40.7 |
| 4,419,882 | 12/1983 | Ishii et al. | 73/40.7 |
| 4,459,844 | 7/1984 | Burkhart | 73/40.7 |
| 4,524,607 | 6/1985 | Pelletier et al. | 73/40.7 X |
| 4,583,394 | 4/1986 | Murakami et al. | 73/40.7 |
| 4,688,627 | 8/1987 | Jearrluc et al. | 73/40.7 X |

FOREIGN PATENT DOCUMENTS

| | | | |
|---|---|---|---|
| 3230146 | 2/1984 | Fed. Rep. of Germany . | |
| 2304911 | 3/1976 | France | 73/40.7 |
| 18712 | 6/1968 | Japan | 73/40.7 |
| 314092 | 5/1972 | U.S.S.R. | 73/40.7 |
| 1379661 | 3/1988 | U.S.S.R. | 73/40.7 |

Primary Examiner—Hezron E. Williams
Assistant Examiner—Joseph W. Roskos
Attorney, Agent, or Firm—Spencer & Frank

[57] ABSTRACT

The present invention relates to a leak checking method for systems filled with fluids. A test gas, preferably helium, is introduced into the fluid and test gas escaping through any leak in the wall of the system is detected with the aid of a test gas-sensitive detector. This method allows highly sensitive and continuous leak checks.

19 Claims, 3 Drawing Sheets

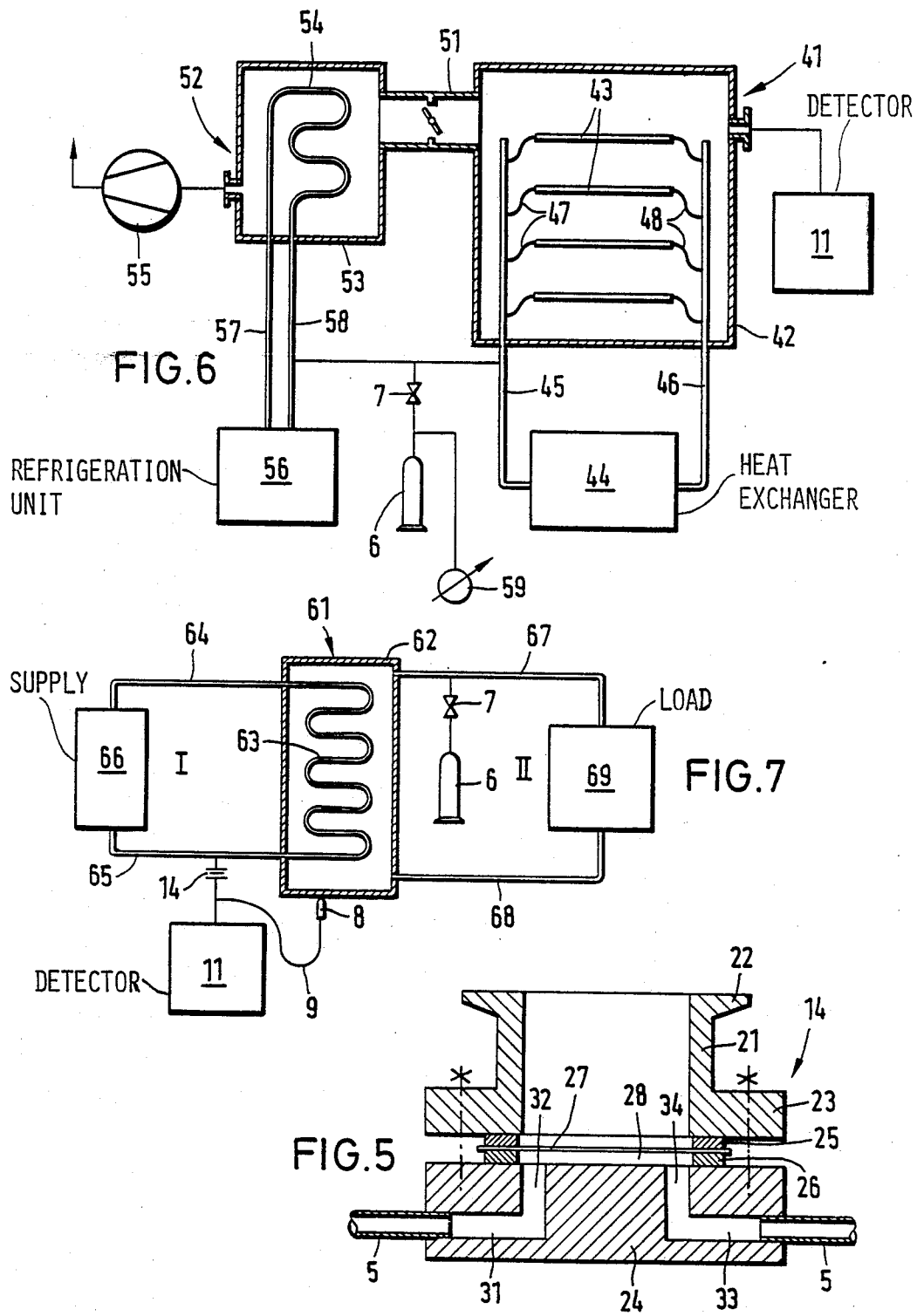

METHOD AND APPARATUS FOR TESTING FLUID-FILLED SYSTEMS FOR LEAKS

FIELD OF THE INVENTION

The present invention relates to a method for testing systems filled with fluids (liquids, vapors or gases) for leaks. The invention also relates to an apparatus suitable for the implementation of this method.

TECHNOLOGY REVIEW

In past practice, closed systems filled with fluids during operation are tested for leaks only before filling or after removal of the fluid. Such systems include, for example, circulating cooling systems, transporting conduits, pump systems, heat exchangers, liquid containers, steam turbines and many more.

German Offenlegungsschrift (non-examined published application) No. 3,230,146 discloses the testing of closed pipeline systems for leaks in that the tightly closed system is pressurized with a fluid, pressure is maintained over a longer period of time and this pressure is monitored by means of a measuring instrument. If there is no drop in pressure, it means that the tested system is tight.

Leak detection of this type is relatively insensitive. Moreover, the systems to be monitored in this manner must be designed so that they are able to withstand a relatively high testing pressure. Further, it is generally impossible to continuously monitor the pipeline system for leaks while the system is in operation since it would require constant maintenance of the test pressure.

SUMMARY OF THE INVENTION

It is an object of the present invention to provide a method and an apparatus of the above-mentioned type in which highly sensitive leak detection or leak monitoring can be performed continuously.

This is accomplished according to the invention in that a test gas, for example, helium, argon or other noble gas, is introduced into the fluid, is preferably dissolved therein and any test gas that escapes through a leak is detected with the aid of a detector sensitive to the test gas. It is an advantage of the invention that, particularly using helium as the test gas, preferably in physically dissolved form, it is possible to perform extremely sensitive leak detection or leak monitoring in pipelines and other systems containing fluids. If a leak exists, the test gas passes through the leak and is detected by a detector specific for the test gas, preferably a mass spectrometer set to mass 4 when helium is the test gas.

In a suitable embodiment of the method according to the invention, a helium reservoir is at least temporarily connected to the fluid system. This causes the helium to go into solution in the fluid. As long as the fluid system is tight, the helium also remains within this system. If a leak occurs, fluid, with helium dissolved therein, escapes. Detection of the helium can be effected with the aid of a sampling probe leak detector in that the regions of the fluid system to be checked or monitored for leaks are covered by the sampling probe. However, it is particularly advantageous if the area of the fluid system to be monitored for leaks is disposed in a closed space, for example a chamber, to which is connected a leak detector including a detector specific for the test gas. The leak detection according to this method is so sensitive that even extremely small leaks can be detected which, due to the surface tension of the fluid in the system, are not large enough to allow fluid to escape. For leaks of this size, helium diffuses through the leak and can be detected.

In a further variation of the method according to the invention, the regions of the fluid system to be checked for leaks are externally charged with helium. If a leak exists, helium passes through the leak into the fluid and is dissolved there. With the aid of a known leak detector connected to the fluid system by way of a helium permeable membrane, the helium diffusing through the membrane can be detected. Charging the region of interest in the fluid system with the test gas can be effected by spraying. Another possibility is to dispose the region of interest in a closed space, for example a chamber, which contains helium in a sufficient concentration.

BRIEF DESCRIPTION OF THE DRAWINGS

FIG. 5 is a sectional elevational view of an embodiment of a membrane separator forming part of the embodiment of FIG. 3.

FIG. 6 is a schematic view of a freeze-drying system in which the present invention is employed.

FIG. 7 is a schematic view of a heat exchanger in which the present invention is employed.

DESCRIPTION OF THE PREFERRED EMBODIMENTS

A pipe system 1 for circulating a fluid is shown schematically in FIGS. 1 to 4 and includes a coiled pipe 2, a supply device 3 (for example a refrigeration machine in a circulating cooling system) and connecting conduits 4 and 5.

Figure 1:
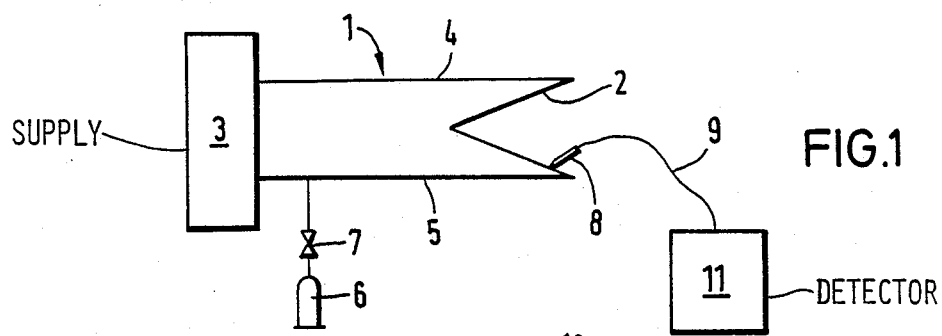
FIGS. 1, 2, 3 and 4 are schematic views of four preferred embodiments of the invention employed in a pipe system.
Figure 2:
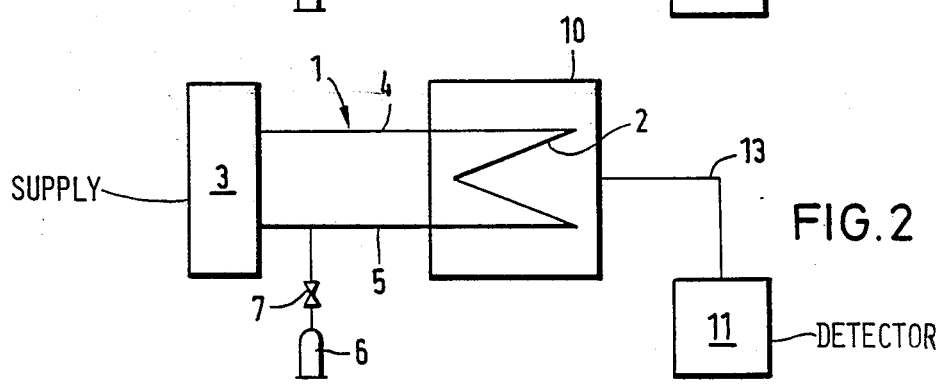

In the embodiments of FIGS. 1 and 2, a test gas reservoir (compressed gas cylinder 6) is connected by way of a valve 7 to one of connecting conduits 4 and 5. If valve 7 is open, test gas, preferably helium, passes into the fluid in pipe system 1 and goes into solution. If conduit system 1 has a leak, helium escapes even if the leak is so small that, due to the surface tension of the fluid, the fluid itself does not escape. The leak can be detected by checking the regions suspected of leaking with the aid of a sampling probe 8 (FIG. 1). Sampling probe 8 is connected by way of conduit 9 with a detector 11 specific to the test gas. If helium is used as the test gas, this detector is advisably configured as a mass spectrometer. Test gas detector 11 which is shown merely as a block, advisably is a component of a leak detection device which includes further supply devices (vacuum pump, cooling trap, valves and the like).

The embodiment according to FIG. 2 differs from the embodiment of FIG. 1 in that a region of interest in pipeline system 1, in this case coiled pipe 2, is disposed within a sealed area, such as a chamber 10. The detector 11 specific for the test gas, or the leak detector, respectively, is connected to the chamber 10 by way of a conduit 13. In a pipeline system equipped in this manner it is possible to continuously monitor coiled pipe 2 for leaks.

Valve 7, which is connected to pipe system 1 by way of compressed gas cylinder 6, is advisably configured as a pressure reduction valve. On the one hand, this makes it possible to avoid charging pipe system 1 with the full pressure of cylinder 6, and on the other hand, it is possible to monitor the presence of test gas in reservoir 6 by means of an appropriate pressure measuring device. Moreover, it is not necessary to keep valve 7 constantly open for constant monitoring. The important factor is to have a sufficient quantity of test gas dissolved in the fluid of the pipe system. As long as the pipe system is tight, the dissolved test gas remains in the fluid.

Figure 3:
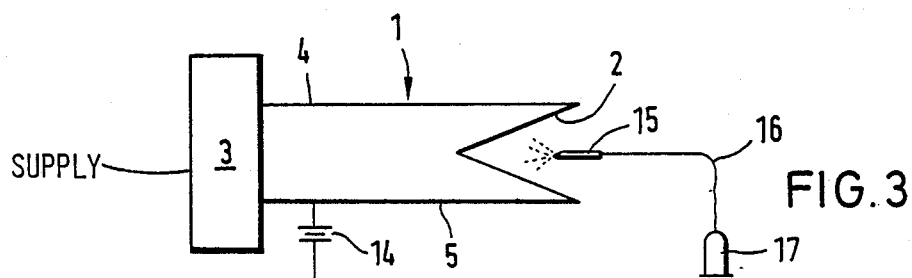
Figure 4:
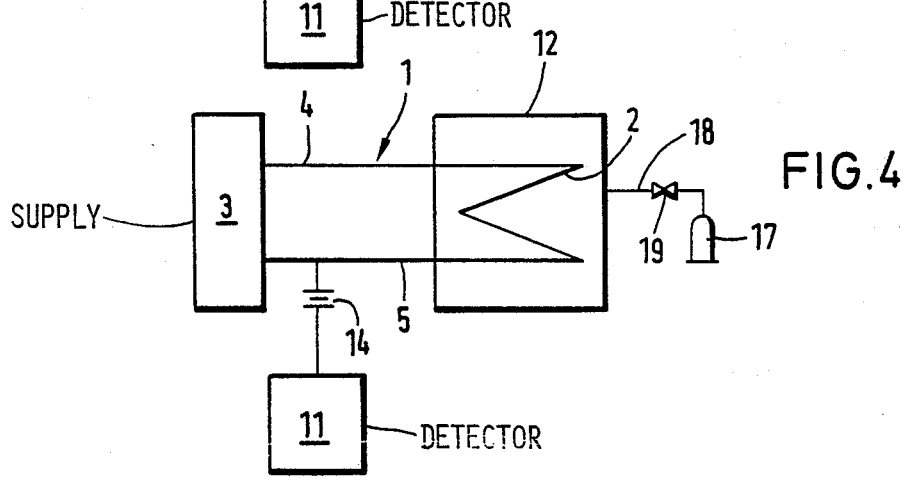

In the embodiment according to FIGS. 3 and 4, the test gas specific detector or leak detector 11 is connected to pipe system 1 by way of a membrane separator 14. In contrast to the embodiments of FIGS. 1 and 2, it is not the escape of test gas through a leak that is monitored but the entrance of test gas through the leak into the fluid. For this purpose the regions of pipeline system 1 to be checked for leaks are bathed in test gas. In the embodiment according to FIG. 3 this is done with the aid of a spray nozzle 15 which is connected by way of a conduit 16 with a test gas reservoir 17. In the embodiment according to FIG. 4, the region of interest, here the coiled pipe 2, is disposed within a closed area, such as a chamber 12. Test gas is introduced into chamber 12 through a conduit 18 which includes a valve 19.

FIG. 5 is a cross-sectional view of an embodiment of a membrane separator 14 connecting a test gas specific detector 11 to pipe system 1. The membrane separator 14 is composed of a conduit section 21 equipped at its frontal ends with flanges 22 and 23. Test gas specific detector 11 is connected to flange 22.

The numeral 24 identifies a conduit element connected, for example, in conduit 5 of the pipe system. Flange 23 of conduit section 21 is screwed onto one frontal face of the conduit element 24. Two rings 25 and 26, preferably made of copper and enclosing between them a membrane 27, are disposed between flange 23 and conduit element 24. Thus a chamber 28 is produced between the frontal face of element 24 and membrane 27. The sections of pipeline 5 ending in conduit element 24 continue in bores 31, 32 and 33, 34, respectively, which each open into chamber 28. Thus the fluid flowing through conduit 5 is conducted through chamber 28 approximately parallel to membrane 27.

Membrane 27 is permeable for the selected test gas but practically impermeable for the fluid flowing through pipeline 5. If helium is used as the test gas, the membrane is preferably a sheet of fluorinated ethylene propylene resin (FEP) carbontetrafluoride about 1/10 mm thick. Helium dissolved in the fluid flowing through pipeline 5 is able to pass through membrane 27 and is detected by the connected test gas detector or leak detector without the latter being endangered by the fluid.

FIG. 6 shows a freeze-drying device 41 in which the present invention is employed. The freeze-drying device is composed of a chamber 42 equipped with product shelves 43 for containers holding the product to be lyophilized. Product shelves 43 in a freeze-drying apparatus of this type are customarily heatable since heat must be provided for the product to be lyophilized so as to accelerate the process. Frequently, such product shelves 43 are also coolable so that the freezing required in the freeze-drying process can also take place within chamber 42.

The temperature adjustment of product shelves 43, which themselves are made in a double wall configuration, is effected with the aid of heat exchange device 44. Two conduits 45 and 46 lead from the device 44 into freeze-dry chamber 42. Product shelves 43 themselves are connected parallel to one another to conduits 45 and 46 by way of flexible conduits 47 and 48 so that the fluid serving as the heat transporting agent (a silicone oil or a brine) circulates through the pipeline system composed of product shelves 43, heat exchange device 44 and conduits 45, 46.

An evacuation device 52 is connected by pipeline 51, to freeze-drying chamber 42 and includes the cooled coiled pipe system 54 disposed in chamber 53 and a vacuum pump 55 connected to a condenser chamber 53. A refrigeration unit 56 connected by way of conduits 57 and 58 with coiled pipe 54 serves to supply the coiled pipe 54 in condenser chamber 53.

Freeze-drying processes are employed with preference in the manufacture of medicinal preparations. The value of a single charge of such a preparation is frequently very high. The protection of such a preparation against contamination which could occur, for example, due to leaks in the conduit system for the heating and/or cooling medium is therefore of particular significance. To be able to constantly monitor those parts of the fluid system from which contamination could occur in the case of a leak, the following measures are taken: Conduits 45 and 58 are connected—as in the embodiments of FIGS. 1 and 2—by way of valve 7 to a test gas reservoir 6, preferably a container of pressurized helium. To monitor the supply of test gas, a pressure measuring gauge 59 is provided. This connection of the test ga reservoir makes it possible for helium to dissolve in the fluids present in the conduit systems. Freeze-dry chamber 42 is further connected to the test gas sensitive detector 11. If a leak occurs in the critical regions of the conduit systems, that is, within chamber 42 or the condenser 53, helium will escape and reach test gas specific detector 11.

It is also possible to connect the test gas detector to the conduit systems of the freeze-drier and condenser by way of a membrane separator 14. This requires that the freeze-drying process take place in a test gas atmosphere.

FIG. 7 is a schematic illustration of a further example: a heat exchanger 61. The latter includes a housing 62 in which is disposed a coiled pipe 63. Coiled pipe 63 is connected with a supply device 66 by way of conduits 64 and 65 which are brought out of housing 62 to form, for example, a primary circuit I. The secondary circuit II is formed of the interior of housing 62 as well as conduits 67 and 68 which lead to a load 69.

In order to be able to check whether heat exchanger 61 is tight particularly in the region in which the media of primary circuit I and secondary circuit II are conducted in close proximity, one of the two circuits (in the illustrated embodiment secondary circuit II) is connected by way of valve 7 to test gas reservoir 6. This causes test gas to be dissolved in the fluid of the secondary circuit. If coiled pipe 63 leaks, test gas, preferably helium, will enter into primary circuit I which, in turn, is connected by way of membrane separator 14 to the test gas specific detector or leak detector 11. Helium is then detected, if coiled pipe 63 has a leak.

In the illustrated embodiment there also exists the possibility of leak checking the heat exchanger housing 62 from the outside. This is done with the aid of a sampling probe 8 which is also connected to leak detector 11 by way of conduit 9. If helium escapes through a leak existing in housing 62, it can be recorded with the aid of sampling probe 8.

Figure 8:
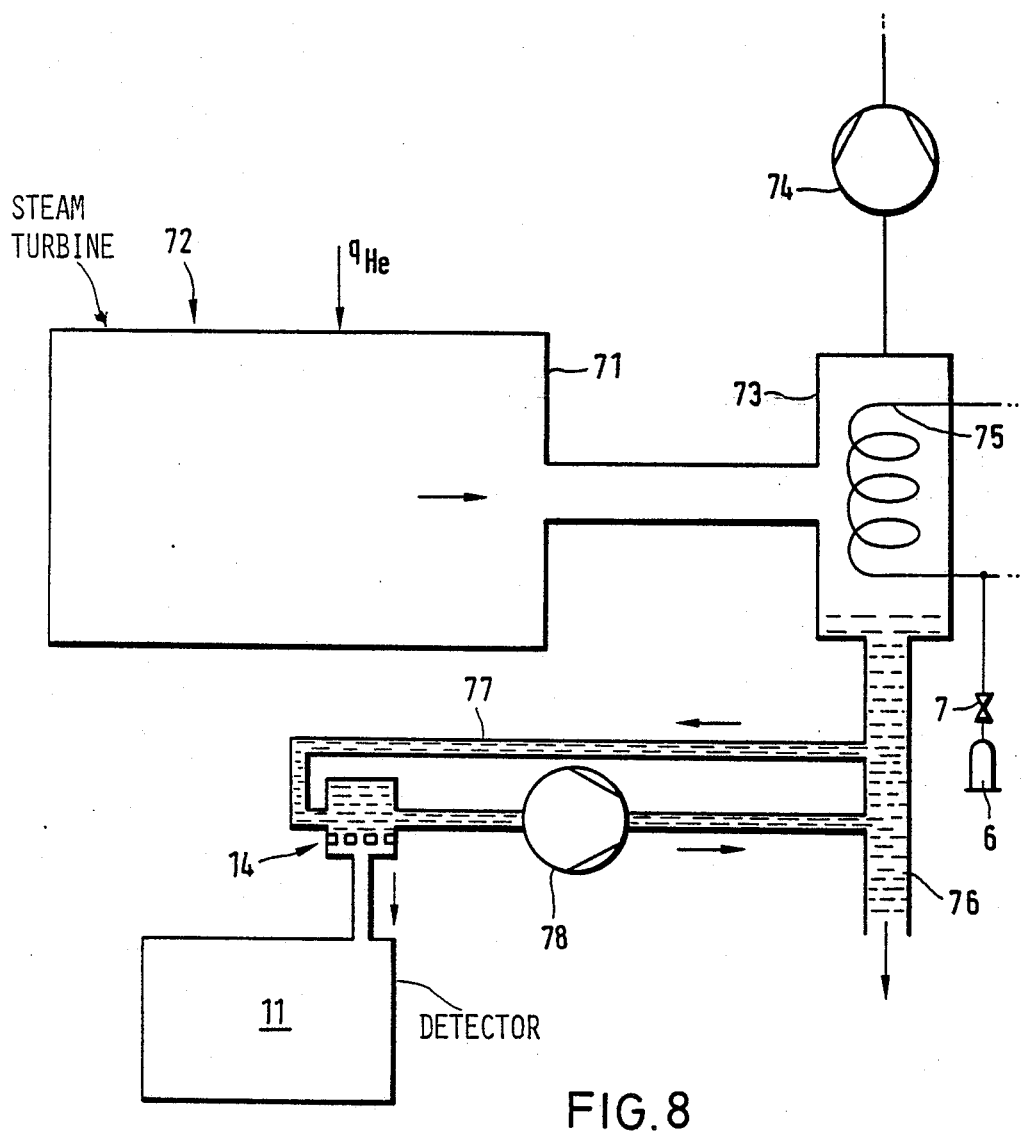
FIG. 8 is a schematic view of a steam turbine employing the present invention.

FIG. 8 is a schematic illustration of the housing 71 of a steam turbine 72. Housing 71 is connected to a condenser 73 which is connected to a vacuum pump 74. A cooling coil 75 at which the steam condenses is disposed in condenser 73. The condensate is discharged through conduit 76.

In order to examine housing 71 of the steam turbine for leaks during operation, it is sprayed with helium at locations where leaks are suspected. If a leak exists, a quantity of helium $q_{He}$ enters into the steam in the turbine. With the steam, the test gas reaches condenser 73. There it comes in contact with the condensate and is dissolved therein. In the case of a leak, the condensate will thus contain helium which can be detected therein.

Since the quantities of condensate are relatively large, it is advisable to provide a bypass 77 equipped with a circulating pump 78 for membrane separator 14. Detector 11 detects the helium in the condensate.

In the embodiment of a steam turbine shown in FIG. 8, there additionally exists the possibility of checking for leaks or monitoring condenser coil 75 during operation if test gas reservoir 6 is connected by way of valve 7 to the coiled circuit. In the case of a leak in cooling coil 75, test gas, preferably helium, contained in the cooling medium of the circuit would mix with the condensate and could be detected with the aid of membrane separator 14 and detector 11.

The significant advantage of the present invention is that sensitive helium leak detection is possible, on line if desired, in systems filled with fluid. If one assumes that the quantity of helium dissolved in the fluid is large compared to the throughput of helium through membrane separator 14, the dissolved helium concentration can be determined in a quasi-equilibrium. The significant factor is that the fluid constantly flows over membrane 27 so that no test gas or helium derichment of the fluid occurs. The magnitude of the leak can be calculated from the physical parameters of the fluid (solubility, temperature and the like) and of membrane 27.

Depending on which leak detection method is employed, a sensitivity of about $10^{-9}$ mbar 1/s can be achieved. The decisive factor is the concentration at which helium is present in the respective liquid. The greatest sensitivity can be realized with a method in which a helium reservoir is connected to the fluid system so that helium is dissolved in liquid to saturation. Generally liquids are unable to escape through leaks in the stated order of magnitude so that such leaks can be detected in liquid systems before the liquid itself is able to escape.

The ability of performing constant leak detection during the normal operation of steam or liquid systems, saves maintenance time, increases the availability of the systems and may save time and expense in the case of malfunction. Some leaks (for example cold leaks, leaks under pressure conditions) can often not be detected with conventional methods in the "dry" state of the apparatus. The method of the present invention makes it possible to detect such leaks even during operation.

It will be understood that the above description of the present invention is susceptible to various modifications, changes and adaptations, and the same are intended to be comprehended within the meaning and range of equivalents of the appended claims.

What is claimed is:

1. A method of determining the presence of a leak in a system containing a fluid, which at least has a liquid phase, comprising:

exposing a part of the system to be tested to a test gas, passing the fluid past a membrane separator, and sampling for the presence of the test gas that has passed through the membrane separator with the aid of a detector sensitive to the test gas.

2. A method as defined in claim 1, wherein the step of exposing includes the step of spraying the region with the test gas.

3. A method of defined in claim 1, wherein the step of exposing includes the step of enclosing the region in a chamber containing the test gas.

4. A method as defined in claim 1, wherein said test gas is helium.

5. An apparatus for detecting a leak in a system filled with a fluid which at least has a liquid phase, comprising:

a test gas supply means for exposing the system to a test gas;

a membrane separator means, being permeable to the test gas and impermeable to the fluid, positioned on a portion of the system and in contact with the liquid phase of the fluid flowing through the system; and a detector means, connected to the membrane separator and external to the system, for sensing the presence of test gas in the system.

6. An apparatus as defined in claim 5, wherein the system has a part to be monitored for leaks; further comprising a chamber means for enclosing said part; said detector means being operatively connected to said chamber means.

7. An apparatus as defined in claim 5, wherein said test gas supplying means include a test gas reservoir and connecting means for connecting said test gas reservoir to said system; further comprising pressure reduction valve means for connecting the test gas reservoir to the system for maintaining a pressure differential between the test gas reservoir and the system.

8. An apparatus as defined in claim 5, wherein said test gas supplying means comprises means for externally contacting the system with the test gas for introducing the test gas into the fluid through a leak; said detector means being operatively connected to the membrane separator means for determining the presence of the test gas that passed through said membrane separator from said fluid in the system.

9. An apparatus as defined in claim 8, wherein the means for externally contacting the system with the test gas comprises a chamber for enclosing a region of the system, said chamber containing test gas so that said test gas is capable of entering the system if a leak is present in the enclosed region.

10. An apparatus as defined in claim 8, wherein the membrane separator means includes a fluid chamber means for conducting fluid from the system past the membrane, said fluid chamber means having a wall region formed by said membrane.

11. An apparatus as defined in claim 5 in combination with a freeze-drying apparatus, comprising a freeze-drying chamber; double-walled product shelves disposed therein; said system filled with a fluid comprising a conduit system for adjusting the temperature of the product shelves, wherein part of said conduit system is disposed outside said chamber; said test gas supplying means including a test gas reservoir being connected to said part of said conduit system; said detector means being connected to said chamber to detect any test gas escaping through a leak in said conduit system into said chamber.

12. A combination as defined in claim 11, further comprising a condenser connected to said chamber; said system filled with a fluid comprising a condenser conduit system for conducting a coolant through said condenser; said condenser conduit system being connected to the test gas reservoir.

13. An apparatus as defined in claim 5 in combination with a freeze-drying apparatus, comprising: a freeze-drying chamber; double-walled product shelves disposed therein; said system filled with a fluid comprising a conduit system for adjusting the temperature of said product shelves, wherein part of said conduit system is disposed outside said chamber; said detector means being connected to said conduit system outside said freeze-drying chamber; further wherein a test gas atmosphere is maintained within said freeze-drying chamber.

14. An apparatus as defined in claim 5 in combination with a heat exchanger, comprising: a housing; said system filled with a fluid comprising a primary circuit and a secondary circuit each containing a fluid sealed from one another and interacting for effecting a heat exchange; said test gas supplying means including a test gas reservoir being connected to one of said circuits; a membrane separator means for separating test gas from a fluid being connected to the other of said circuits; said detector means being connected to said membrane separator means.

15. An apparatus as defined in claim 5 in combination with a steam turbine comprising: a housing; a condenser; said system filled with a fluid comprising a condensate discharge conduit; and a membrane separator means for separating a test gas, wherein said membrane separator means is attached to said discharge conduit and said detector means is operatively connected with said membrane separator means.

16. A combination as defined in claim 15, wherein the membrane separator means is disposed in a bypass means for conducting a condensate past said membrane separator means.

17. A combination as defined in claim 15, wherein said system filled with a fluid comprises a coolant circuit containing cooling oil; said test gas supplying means including a test gas reservoir being connected to said coolant circuit.

18. An apparatus as defined in claim 5, wherein said test gas supplying means include a test gas reservoir and connecting means for connecting said test gas reservoir to said system.

19. An apparatus as defined in claim 5, wherein the membrane separator means comprises
an inflow conduit through which fluid from the system flows;
a chamber communicating with an open end of the inflow conduit;
a membrane being permeable to the test gas and impermeable to the fluid; said membrane bounding the chamber;
an outflow conduit having an open end communicating with said chamber and being at a distance from said open end of the inflow conduit along said membrane; said outflow conduit returning fluid from the chamber to the system; and
a pipe sealed to a periphery of the membrane on a side opposing the chamber; said pipe being arranged for guiding test gas away from said membrane.

* * * * *